(12) United States Patent
Davis et al.

(10) Patent No.: US 6,531,516 B2
(45) Date of Patent: Mar. 11, 2003

(54) INTEGRATED BITUMEN PRODUCTION AND GAS CONVERSION

(75) Inventors: Stephen Mark Davis, Stewartsville, NJ (US); Michael Gerard Matturro, Lambertville, NJ (US)

(73) Assignee: ExxonMobil Research & Engineering Co., Annandale, NJ (US)

( * ) Notice: Subject to any disclaimer, the term of this patent is extended or adjusted under 35 U.S.C. 154(b) by 123 days.

(21) Appl. No.: 09/818,438

(22) Filed: Mar. 27, 2001

(65) Prior Publication Data

US 2002/0170846 A1 Nov. 21, 2002

(51) Int. Cl.[7] .......................... C07C 27/00; E21B 28/00; C10G 47/02; C10G 45/00
(52) U.S. Cl. .................. 518/700; 518/702; 166/272.3; 166/272.6; 208/108; 208/143
(58) Field of Search ................... 518/700, 702; 166/272.3, 272.6; 208/108, 143

(56) References Cited

U.S. PATENT DOCUMENTS 6,096,192 A * 8/2000 Myers et al. ............... 208/108
6,357,526 B1 * 3/2002 Abdel-Halim et al. ... 166/272.3

* cited by examiner

*Primary Examiner*—J. Parsa

(57) ABSTRACT

An integrated gas conversion and bitumen production process utilizes steam and light hydrocarbons produced from a natural gas fed gas conversion process, to stimulate the bitumen production and dilute it for transportation by pipeline. Hydrogen for hydroconversion of the bitumen and hydroisomerization of gas conversion hydrocarbons may be produced from part of the synthesis gas generated from the natural gas. The bitumen diluent is preferably naphtha produced by the gas conversion and the diluted bitumen is pipelined to a bitumen upgrading facility.

22 Claims, 3 Drawing Sheets

INTEGRATED BITUMEN PRODUCTION AND GAS CONVERSION

BACKGROUND OF THE DISCLOSURE

Field of the Invention

The invention relates to a process in which hydrocarbons and steam produced by a gas conversion process are used to stimulate bitumen production and transport. More particularly, the invention relates to a process in which natural gas is converted to a Fischer-Tropsch synthesis gas feed, from which liquid hydrocarbons and steam are produced to facilitate bitumen production and transportation by pipeline to refining facilities.

BACKGROUND OF THE INVENTION

Very heavy crude oil deposits, such as the tar sand formations found in places like Canada and Venezuela, contain trillions of barrels of a very heavy, viscous petroleum, commonly referred to as bitumen. The bitumen has an API gravity typically in the range of from $5^O$ to $10^O$ and a viscosity, at formation temperatures and pressures, that may be as high as a million centipoise. The hydrocarbonaceous molecules making up the bitumen are low in hydrogen and have a resin plus asphaltenes content as high as 70%. This makes the bitumen difficult to produce, transport and upgrade. Its viscosity must be reduced in-situ underground for it to be pumped out (produced). While in-situ bitumen dilution with an aromatic solvent has been proposed for the viscosity reduction (Canadian patent 1,034,485), bitumen production is commonly facilitated by steam stimulation. In steam stimulated bitumen production, hot steam is injected down into the formation to lower the viscosity of the oil sufficient to pump it out of the ground. This is disclosed, for example, in U.S. Pat. No. 4,607,699. U.S. Pat. No. 4,874,043 discloses alternately pumping steam and hot water into the ground. However, steam-produced bitumen is still too viscous to be transported to upgrading facilities by pipeline. Therefore, it must be diluted with a compatible, lower viscosity liquid, in an amount sufficient to produce a mixture having a viscosity low enough to be transported by pipeline. This is known and disclosed, for example, in U.S. Pat. No. 6,096,192. One significant feature of bitumen production is a source of readily available steam, some of which is lost or consumed in the process and cannot be recovered. Another is a plentiful supply of a compatible bitumen diluent, especially if it is used in a once-through fashion and preferably without requiring a downstream bitumen conversion operation to produce the diluent. In the '192 process, the diluent is obtained by forming a mixture of natural gas condensate and low boiling hydrocarbons obtained from partial catalytic hydroconversion of the bitumen. A plentiful source of hydrogen is required for upgrading bitumen middle distillate fuels produced by the bitumen conversion. When bitumen diesel production is desired, a blending component relatively high in cetane is needed to mix with the lower cetane bitumen diesel.

Gas conversion processes produce hydrocarbons from a synthesis gas derived from natural gas, as is well known. The synthesis gas comprises a mixture of $H_2$ and CO, which are reacted in the presence of a Fischer-Tropsch catalyst to form hydrocarbons. Fixed bed, fluid bed and slurry hydrocarbon synthesis processes have been used, all of which are well documented in various technical articles and in patents. Both light and heavy hydrocarbons are synthesized. In addition to hydrocarbon production, these processes also produce steam and water. It would be an improvement to the art if bitumen production and gas conversion could be integrated, to utilize features of the gas conversion process to enhance bitumen production and products.

SUMMARY OF THE INVENTION

The invention relates to a process in which natural gas is converted to a synthesis gas feed, from which liquid hydrocarbons and steam are produced to facilitate bitumen production, and transportation by pipeline to refining facilities. The conversion of natural gas to synthesis gas and the production of hydrocarbons from the synthesis gas will hereinafter be referred to as "gas conversion". The natural gas used to produce the synthesis gas will typically and preferably come from the bitumen field or a nearby gas well. The gas conversion produces liquid hydrocarbons, steam and water. Thus, the invention broadly relates to an integrated gas conversion and bitumen production process, in which gas conversion steam and hydrocarbon liquids are respectively used to stimulate bitumen production and dilution for transport. The conversion of natural gas to a synthesis gas is achieved by any suitable synthesis gas process. The synthesis gas comprises a mixture of $H_2$ and CO and is contacted with a suitable hydrocarbon synthesis catalyst, at reaction conditions effective for the $H_2$ and CO in the gas to react and produce hydrocarbons, at least a portion of which are liquid. A portion of these liquid hydrocarbons, preferably lower boiling hydrocarbons and more preferably comprising a naphtha fraction, are used to dilute the viscosity of the bitumen produced by the process, so that it can be transported to a refining facility by pipeline. The gas conversion process also produces high and medium pressure steam, all or a portion of which are injected into the ground to stimulate the bitumen production. In addition to hydrocarbons, water is produced by the hydrocarbon synthesis reaction, all or a portion of which may be heated to produce steam for the bitumen production. Thus, by "gas conversion steam" or "steam obtained or derived from a gas conversion process" in the context of the invention is meant to include any or all of the (i) high and medium pressure steam produced by the gas conversion process and (ii) steam produced from heating the hydrocarbon synthesis reaction water, and any combination thereof. This is explained in detail below. By bitumen production is meant steam stimulated bitumen production, in which steam is injected into a bitumen formation, to soften the bitumen and reduce its viscosity, so that it can be pumped out of the ground.

While the hydrocarbon diluent may be recovered, and reused or recycled for the bitumen dilution, it will be more efficacious if is used on a once-through basis, to avoid having to pipeline it from the downstream bitumen conversion facility, back to the bitumen dilution operation. Thus, in a preferred embodiment, the hydrocarbon diluent is not recycled, but is used on a once-through basis. In another embodiment, it is recovered at the bitumen refining facility and recycled back to the bitumen production facility, where it is again used to dilute the bitumen for the pipeline transportation. In a typical integrated process of the invention, a portion of the hydrocarbons synthesized by the gas conversion process are upgraded to produce a synthetic crude or more useful lower boiling products. The bitumen is also upgraded. Upgrading comprises fractionation and typically and preferably one or more conversion operations. By conversion is meant at least one operation in which at least a portion of the molecules is changed and which may or may not include hydrogen as a reactant. For the bitumen this includes conversion by cracking, which may be non-catalytic coking or catalytic cracking, followed by one or more hydroconversion operations explained in more detail below. In another embodiment of the invention, the gas conversion portion of the process can be adjusted to produce extra hydrogen useful for converting the bitumen, lower boiling hydrocarbons produced by the bitumen upgrading and/or hydrocarbons synthesized by the gas conversion process. The hydrocarbon synthesis produces a tail gas that contains methane and unreacted hydrogen. In a further embodiment, this tail gas may be used as fuel to produce steam for bitumen production, pumps or other process utilities.

In a broad sense, the integrated gas conversion and bitumen production process of the invention comprises (i) stimulating the production of bitumen with steam obtained from a natural gas fed gas conversion process that produces steam and hydrocarbons, including liquid hydrocarbons and, (ii) diluting the produced bitumen with a diluent comprising at least a portion of the liquid hydrocarbons to form a pipelineable fluid mixture comprising the bitumen and diluent, and (iii) transporting the mixture by pipeline to a bitumen upgrading facility. By liquid hydrocarbons is meant hydrocarbons that are liquid at standard conditions of room temperature and pressure. In further embodiments the process includes upgrading at least one of, and preferably both the bitumen and at least a portion of the gas conversion hydrocarbons. In a still further embodiment, which is a preferred embodiment, the diluent will comprise a naphtha fraction. In yet further embodiments, at least part of any hydrogen required for upgrading will be produced from the synthesis gas. In a more detailed embodiment, the invention comprises the steps of (i) converting natural gas to a synthesis gas, (ii) producing liquid hydrocarbons and steam from the synthesis gas, (iii) using a portion of the steam to produce bitumen, and (iv) using a portion of the liquid hydrocarbons to dilute the bitumen to lower its viscosity sufficient to enable it to be transported to a refining facility by pipeline. In a still more detailed embodiment the process of the invention comprises:

(i) converting natural gas to a hot synthesis gas comprising a mixture of $H_2$ and CO which is cooled by indirect heat exchange with water to produce steam;

(ii) contacting the synthesis gas with a hydrocarbon synthesis catalyst in a hydrocarbon synthesis reactor, at reaction conditions effective for the $H_2$ and CO in the gas to react and produce heat, liquid hydrocarbons and a gas comprising methane and water vapor;

(iii) removing heat from the hydrocarbon synthesis reactor by indirect heat exchange with water to produce steam;

(iv) passing at least a portion of the steam produced in either or both steps (i) and (iii) down into a tar sand formation to heat soak and reduce the viscosity of the bitumen, sufficient for it to be removed from the formation;

(v) producing the bitumen by removing it from the formation;

(vi) reducing the viscosity of the produced bitumen by mixing it with a diluent comprising a portion of the liquid hydrocarbons produced in step (ii), and (vii) transporting the mixture by pipeline to a bitumen upgrading facility.

Further embodiments include those set forth above, as well as cooling the gas and water vapor produced in step (ii) to condense out and separate the water and form a methane-containing tail gas reduced in $H_2O$, with the water optionally used for the generation of additional steam and the tail gas used as fuel. The gas fuel is used for generating steam for bitumen production and associated process utilities.

DETAILED DESCRIPTION

Figure 1:
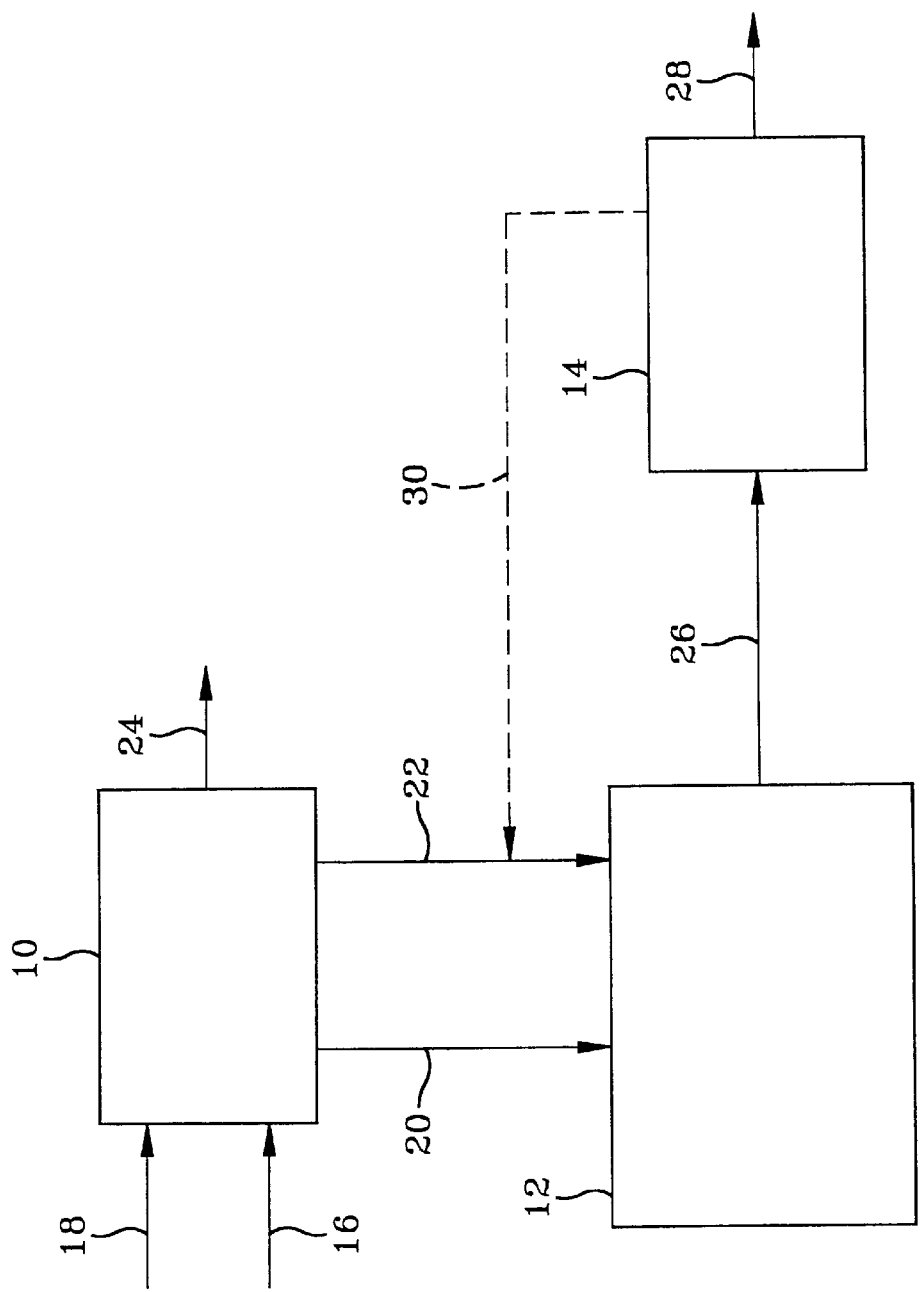
FIG. 1 is a simple block flow diagram of an integrated bitumen production and gas conversion process of the invention.

In the gas conversion portion of the process of the invention, synthesis gas comprising a mixture of $H_2$ and CO is produced by the partial oxidation and/or steam reforming of natural gas, or any other suitable gas comprising primarily methane, by any suitable synthesis gas process. Natural gas is preferred, because of its high methane content and relative cleanliness. Plentiful supplies of natural gas are typically found in or nearby tar sand formations. The synthesis gas, which comprises a mixture of $H_2$ and CO, is used to synthesize hydrocarbons in one or more hydrocarbon synthesis reactors, in which the $H_2$ and CO react in the presence of a Fischer-Tropsch type of catalyst to produce hydrocarbons, including light and heavy fractions. The light fraction comprises naphtha and typically also diesel fractions. The naphtha has the lowest viscosity and it is preferred to use the naphtha to dilute the bitumen for pipeline transportation. Dilution experiments were conducted by diluting a Cold Lake bitumen with $C_5$-250° F. naphtha and with a 250–700° F. middle distillate fraction produced by a Fischer-Tropsch hydrocarbon synthesis reaction. It was found that 31 vol. % of the naphtha was required to reduce the viscosity of the bitumen to 40 cSt @ 40° C. In contrast, 40 vol. % of the distillate fraction and 38 vol. % of the prior art gas condensate diluent were respectively required to achieve the same viscosity. Thus, diluting bitumen with gas conversion naphtha requires significantly less diluent than when using a gas well condensate as the diluent. The gas conversion process also produces high and medium pressure steam, a tail gas useful as fuel, and water. The high pressure steam is produced by cooling the hot synthesis gas exiting the synthesis gas reactor, while the medium pressure steam is produced by cooling the hydrocarbon synthesis reactor. At least a portion of the high and, optionally, the medium pressure steam is used for bitumen production. The fuel gas may be used to heat the water to produce more steam and/or superheat at least one of the high and medium pressure steam. This steam is cyclically or continuously injected into an underground tar sand formation, to heat it and thereby reduce the viscosity of the heavy oil or bitumen sufficient for it to be pumped out of the ground. This is known as steam stimulated bitumen. The term "tar sand" is used herein to describe a sandy formation containing a bitumen-like, extra heavy oil in quantities large enough for it to be economically produced and refined or upgraded into more useful, lower boiling products. In the process of the invention, the steam from the gas conversion process reduces the viscosity of the bitumen, thereby stimulating its production. The bitumen upgrading comprises fractionation and one or more conversion operations.

In the process of the invention, the lower boiling and preferably naphtha liquid hydrocarbons used as a diluent to decrease the viscosity of the bitumen, may be recovered and recycled back for bitumen dilution prior to the bitumen conversion. However, it is preferred that it be used on a once-through basis, to avoid the need for transporting it from the bitumen upgrading facility, back to the bitumen production well area. By lower boiling is meant 700° F., preferably 600° F.–, more preferably 500° F.–, and most preferably naphtha, including both light and heavy naphtha fractions, and mixture thereof. A naphtha fraction has the lowest viscosity and may comprise hydrocarbons boiling in the range of from $C_5$ up to as high as 420–450° F. Heavy naphtha may have a boiling range of from 270–420/450° F., while for a light naphtha it is typically $C_5$-320° F. When maximum diesel production is desired, the cetane-rich diesel fraction produced by the gas conversion will be blended with a hydrotreated diesel fraction produced by bitumen conversion, and not used as diluent. This avoids contaminating the gas conversion diesel with the metal and heteroatom compounds in the bitumen, and the subsequent hydrotreating required by such contamination, since diesel produced by gas conversion does not require hydrotreating for metals, aromatics and heteroatom removal. The integrated process of the invention, which produces the bitumen diluent, also eliminates the need for catalytic hydroconversion of the bitumen to reduce its viscosity before it is diluted and pipelined, that the process disclosed in the '192 patent requires.

It is not unusual for natural gas to comprise as much as 92+ mole % methane, with the remainder being primarily $C_{2+}$ hydrocarbons, nitrogen and $CO_2$. Thus, it is an ideal and relatively clean fuel for synthesis gas production and plentiful amounts are typically found associated with or nearby tar sand formations. While $C_2$–$C_5$ hydrocarbons present in the gas may be left in for synthesis gas production, they are typically separated for LPG, while the $C_{5+}$ hydrocarbons are condensed out and are known as gas well condensate. The methane-rich gas remaining after separation of the higher hydrocarbons, sulfur and heteroatom compounds, and in some cases also nitrogen and $CO_2$, is passed as fuel into a synthesis gas generator. If nitrogen is not removed from the natural gas before converting it into synthesis gas, HCN and $NH_3$ are removed from the synthesis gas after cooling, before it is passed into the one or more hydrocarbon synthesis reactors. In a synthesis gas generator, the natural gas reacts with oxygen and/or steam to form synthesis gas, which then serves as the feed for the hydrocarbon synthesis. Known processes for synthesis gas production include partial oxidation, catalytic steam reforming, water gas shift reaction and combinations thereof. These processes include gas phase partial oxidation (GPOX), autothermal reforming (ATR), fluid bed synthesis gas generation (FBSG), partial oxidation (POX), catalytic partial oxidation (CPO), and steam reforming. ATR and FBSG employ partial oxidation and catalytic steam reforming. A review of these processes and their relative merits may be found, for example, in U.S. Pat. No. 5,883,138. Synthesis gas processes are highly exothermic and it is not uncommon for the synthesis gas exiting the reactor to be, for example, at a temperature as high as 2000° F. and at a pressure of 50 atmospheres. The hot synthesis gas exiting the reactor is cooled by indirect heat exchange with water. This produces a substantial amount of high pressure (e.g., 600–900/2000 psia) steam at respective temperatures of about 490–535/635–700° F., which may be heated even further.

With respect to the downstream bitumen upgrading, the one or more conversion operations will comprise cracking by coking or catalytic cracking, and/or one or more hydroprocessing operations in which hydrogen is a reactant, such as hydrotreating, hydrocracking and isomerization. Coking is more typically used and cracks the bitumen into lower boiling material and coke without the presence of a catalyst. It may be either delayed coking, fluid coking, or catalytic coking and is typically followed by one or more hydroprocessing operations. Partial hydroprocessing may precede coking. The lower boiling material produced by coking is reacted with hydrogen to remove heteroatom and aromatic compounds, as well as add hydrogen to the molecules. This requires a good supply of hydrogen, because the bitumen has a low hydrogen to carbon ratio (e.g., ~1.4–1.8). While most of the metals are removed as part of the coke, the lower boiling hydrocarbons are high in heteroatom compounds (e.g., sulfur), and low in the hydrogen to carbon ratio, although not as low as the raw bitumen. This means that the lower boiling liquid products, such as diesel fractions, resulting from the coking are low in normal paraffins. As a consequence, the cetane number of diesel fractions recovered from bitumen upgrading typically ranges from between about 35–45. While this may be sufficient for a heavy duty road diesel fuel, it is lower than desired for other diesel fuels. The bitumen-derived diesel fractions are therefore blended with diesel fractions having a higher cetane number. Bitumen diesel fractions produced by coking the bitumen are hydrotreated to remove aromatics and heteroatom compounds such as sulfur and nitrogen, to produce a treated diesel fraction useful as a blending stock. The higher cetane number diesel fraction produced from the gas conversion process may be blended with one or more treated diesel fractions, to produce diesel fuel stocks. Diesel fuel is produced by forming an admixture of a suitable additive package and a diesel fuel stock.

The table below illustrates a typical hydrocarbon product distribution, by boiling range, of a slurry Fischer-Tropsch hydrocarbon synthesis reactor employing a catalyst comprising a cobalt catalytic component on a titania-containing silica and alumina support component.

| Wt. % Product Distribution from Slurry Hydrocarbon Synthesis Reactor | |
|---|---|
| IBP($C_5$) - 320° F. | 13 |
| 320–500° F. | 23 |
| 500–700° F. | 19 |
| 700–1050° F. | 34 |
| 1050° F.+ | 11 |

As the data in the table show, the light naphtha fraction is 13 wt. % of the total hydrocarbon synthesis reactor product, while the middle distillate fraction (including diesel) is 42 wt. %. The 500–700° F. high cetane fraction is 19 wt. % of the total product, or 45 wt. % of the middle distillate fraction. While not shown, the total ($C_5$-400° F.) fraction is from about 18–20 wt. % of the total product. It is this naphtha, optionally including the heavy, 400° F.+ naphtha, which is used as a diluent for the bitumen to transport it by pipeline to a refining facility. If diluent recycle is employed, once equilibrium is reached in the process, only a small fraction of the gas conversion naphtha will be needed as makeup for the bitumen dilution, with the rest sent to further processing for use in mogas blending.

If maximum diesel production is desired, then in addition to the diesel produced by the gas conversion process, all or a portion of the heavy naphtha produced by the gas conversion may be blended with hydrotreated diesel derived from the bitumen, and not used for dilution. In this case, all or a portion of the diesel fraction produced by the gas conversion, and preferably at least the 500–700° F.+ fraction), may also be blended with the bitumen diesel. Middle distillate production is increased by converting the 700° F.+ waxy gas conversion hydrocarbons to hydrocarbons boiling in the middle distillate range. Those skilled in the art know that hydroisomerizing the 700° F.+ waxy fraction includes mild hydrocracking (c.f., U.S. Pat. No. 6,080,301 in which hydroisomerizing the 700° F.+ fraction converted 50% to lower boiling hydrocarbons). Thus, if desired all or a portion the higher 700° F.+ fraction may be hydrocracked and hydroisomerized to produce additional diesel material.

The invention will be further understood with reference to the Figures. Referring first to FIG. 1, a gas conversion plant 10 is located over, adjacent to or proximate to a bitumen production facility 12, which transports diluted bitumen via pipeline, to a bitumen upgrading facility 14. Production facility 12 comprises an underground tar sand formation and means (not shown) for injecting steam down into the formation, pumping out the softened bitumen, separating gas and water from the produced bitumen, and diluting the produced bitumen with naphtha for transportation by pipeline. Natural gas comprising mostly methane, along with air or oxygen, and preferably oxygen, are respectively passed into the gas conversion plant via lines 16 and 18. The gas conversion plant produces synthesis gas, hydrocarbons, high and medium pressure steam, water and a tail gas useful as fuel. Naphtha comprises a portion of the synthesized hydrocarbons. Steam and naphtha are passed from the gas conversion plant to the bitumen production facility via lines 20 and 22, respectively. The rest of the hydrocarbons are removed via line 24. The steam is passed down into the underground tar sand formation to stimulate the bitumen production and the produced bitumen is diluted with the naphtha. The resulting mixture of bitumen and naphtha is transported to the bitumen upgrading facility 14, via pipeline 26. In the upgrading facility, the bitumen is upgraded by fractionation and preferably including one or more conversion operations. The one or more upgraded products resulting from the bitumen upgrading are removed from 14 via line 28. If desired, all or a portion of the naphtha diluent may be recovered at 14 and recycled, via line 30, back to 22 for bitumen dilution.

Figure 2:
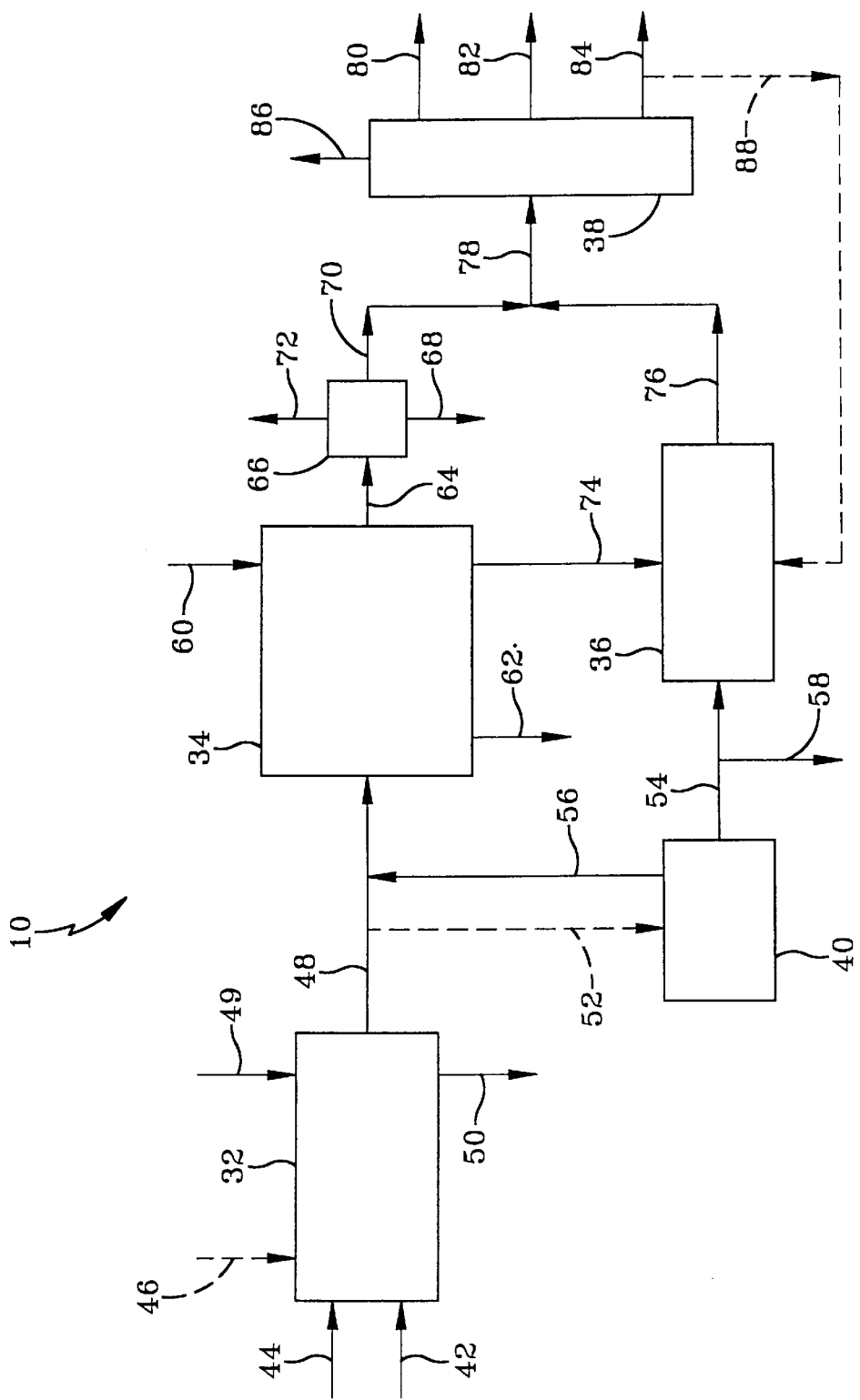
FIG. 2 is a flow diagram of a gas conversion process useful in the practice of the invention.

The gas conversion plant 10 shown in FIG. 2 comprises a synthesis gas generating unit 32, one or more hydrocarbon synthesis reactors 34, a hydroisomerizing unit 36, a fractionating column 38 and a hydrogen separating unit 40. Natural gas that has been treated to remove heteroatom compounds, particularly sulfur, and $C_2$–$C_{3+}$ hydrocarbons, is passed into the synthesis gas generator generating unit 32, via line 42. In a preferred embodiment, the natural gas will have been cryogenically processed to remove nitrogen and $CO_2$, in addition to the sulfur and $C_2$–$C_{3+}$ hydrocarbons. Oxygen from an oxygen plant is fed into the synthesis gas generator via line 44. Optionally, water or water vapor is passed into the synthesis gas generator via line 46. The hot synthesis gas produced in the generator is cooled by indirect heat exchange (not shown), with water entering the unit via line 49. This produces high pressure steam, all or a portion of which may be passed, via line 50, to the bitumen producing facility to stimulate the bitumen production. The pressure and temperature of this steam may be as high as 2000/2200 psia and 635/650° F. The cool synthesis gas is passed from unit 32 into the hydrocarbon synthesis unit 34, via line 48. A slip stream of the synthesis gas is removed via line 52 and passed into a hydrogen production unit 40, in which hydrogen is produced from the gas and passed, via line 54, into a hydrocarbon hydroisomerization unit 36. In unit 40, hydrogen is produced from the synthesis gas by one or more of (i) physical separation means such as pressure swing adsorption (PSA), temperature swing adsorption (TSA) and membrane separation, and (ii) chemical means such as a water gas shift reactor. If a shift reactor is used due to insufficient capacity of the synthesis gas generator, physical separation means will still be used to separate a pure stream of hydrogen from the shift reactor gas effluent. Physical separation means for the hydrogen production will typically be used to separate the hydrogen from the synthesis gas, irrespective of whether or not chemical means such as a water gas shift reaction is used, in order to obtain hydrogen of the desired degree of purity (e.g., at least about 90%). TSA or PSA which use molecular sieves can produce a hydrogen stream of 99+% purity, while membrane separation typically produces at least 80% pure hydrogen. In TSA or PSA the CO rich offgas is sometimes referred to as the adsorption purge gas, while for membrane separation it is often referred to as the non-permeate gas. In a preferred embodiment, the synthesis gas generator produces enough synthesis gas for (i) the hydrocarbon synthesis reaction and (ii) for the production of at least a portion of the hydrogen needed for hydroisomerization, by physical separation means, so that a water gas shift reactor will not be needed. Producing hydrogen from the synthesis gas using physical separation means provides relatively pure hydrogen, along with an offgas which comprises a hydrogen depleted and CO rich mixture of $H_2$ and CO. This CO rich offgas may be used as fuel or fed into the hydrocarbon synthesis reaction zone. If hydrogen is produced from the synthesis gas, it is preferred that the mole ratio of the $H_2$ to CO in the gas be greater than stoichiometric, with at least a portion of the CO produced (separated) from the hydrogen in 40 passed back into line 48, via line 56, and preferably in an amount sufficient to adjust the $H_2$ to CO mole ratio in the syntheses gas passing into 34 to about stoichiometric. This avoids wasting the valuable CO by burning it as fuel. Hydrogen production from synthesis gas by one or more of (PSA), (TSA), membrane separation, or a water gas shift reaction is known and disclosed in, for example, U.S. Pat. No. 6,043, 288. If the bitumen upgrading facility is close enough to the hydrogen production unit to permit it, a portion of the separated hydrogen is removed from line 54, via line 58, and passed to the bitumen upgrading facility to provide reaction hydrogen for hydroconverting one or more of the upgraded bitumen products, such as hydrotreating a bitumen-derived diesel fraction.

In the hydrocarbon synthesis reaction unit 34, the $H_2$ and CO in the synthesis gas react in the presence of a suitable hydrocarbon synthesis catalyst to produce hydrocarbons, including a light fraction and a heavy fraction. The synthesis reaction is highly exothermic and the interior of the one or more synthesis reactors must be cooled. This is accomplished by indirect heat exchange means (tubes) in the reactor, in which circulating cooling water maintains the desired reaction temperature. This converts the cooling water to medium pressure steam having a pressure and temperature of, for example, from 150–600 psia and 250–490° F. Thus cooling water enters the unit via line 60, cools the interior of the one or more synthesis reactors (not shown) and turns to medium pressure steam which is passed out via line 62. All or a portion of this steam may also be used for bitumen production; for utilities in the gas conversion process, for fractionation, etc. If the bitumen upgrading facility is close enough, all or a portion of this steam may be passed to the bitumen upgrading unit, where it may be used for power generation, to supply heat for fractionation, to lance coke out of a coker, etc. It is preferred to heat this medium pressure steam to a superheat quality, before it is used for bitumen production. The hydrocarbon synthesis reaction produces light and heavy hydrocarbons, with the heavy hydrocarbons being liquid at the synthesis reaction conditions. By heavy is meant boiling generally above 500–700° F. The lighter hydrocarbons pass out of the synthesis reactor as vapor, along with unreacted synthesis gas, $CO_2$ and water vapor. This vapor is passed out of the reactor via line 64 into 66, in which it is cooled in one or more stages, during which water and $C_2$–$C_{3+}$ hydrocarbons condense to liquid and are separated from each other and from the remaining tail gas. The water is withdrawn via line 68 and the liquid, light hydrocarbons via line 70. The water may be used for cooling, steam generation and the like. The remaining uncondensed gas comprises mostly methane and $\sim C_3$ _ light hydrocarbons, $CO_2$, and unreacted synthesis gas and is removed via line 72 and used as fuel to heat boilers for making steam for power generation, bitumen stimulation and upgrading, and general process utilities. The water removed via line 68 may be heated to steam for any of these purposes, but preferably for steam for bitumen upgrading and for power generation, due to its relative purity. The heavy synthesized hydrocarbons are removed from the hydrocarbon synthesis unit via line 74 and passed into hydroisomerization unit 36, which comprises a hydroisomerization reactor, in which they are cracked and hydroisomerized with hydrogen in the presence of a suitable catalyst, to produce lighter hydrocarbons and hydrocarbons having lower boiling and pour points. In this embodiment, at least a portion of the reaction hydrogen required is obtained from the hydrogen produced in 40 and which enters the unit via line 54. The hydroisomerized hydrocarbons are passed, via line 76, to line 78, where they mix with the light fraction of the synthesized hydrocarbons and pass into fractionater 38. They are then fractionated into various fractions, including a naphtha fraction 80, a diesel or middle distillate fraction 82 and a lube fraction 84. Any $C_{4-}$ hydrocarbons present in the fractionater are removed as overhead and used as fuel. Optionally, all or a portion of the lube fraction may be recycled back into hydroisomerizing unit 36 via line 88, and hydrocracked/hydroisomerized to extinction, to produce more middle distillate fuel fractions, such as diesel and jet fuel. All or a portion of the naphtha fraction, and preferably comprising at least a light naphtha fraction removed from the fractionater via line 82, is passed to the bitumen producing facility 12, for bitumen dilution.

Figure 3:
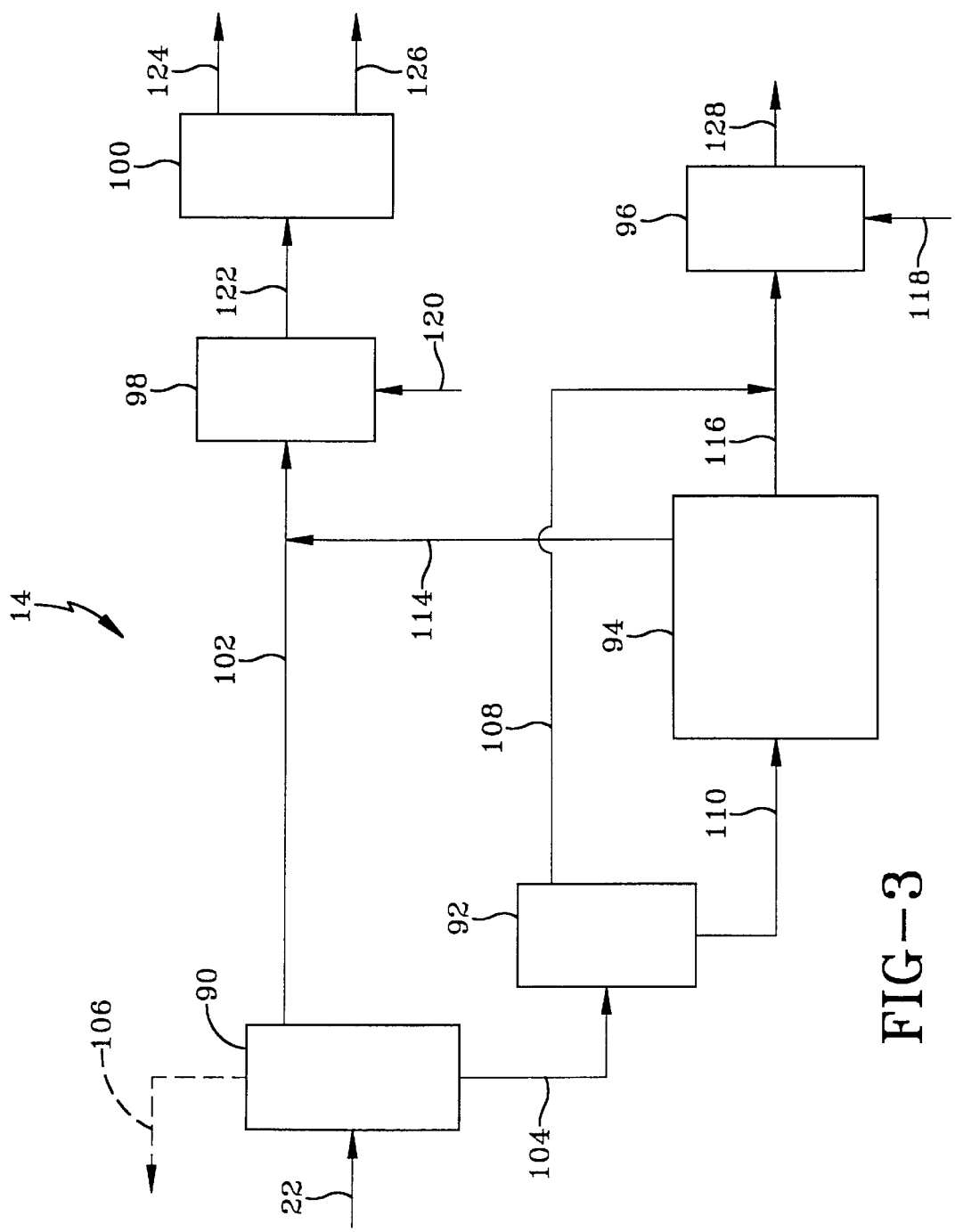
FIG. 3 is a block flow diagram of a bitumen upgrading process useful in the practice of the invention.

One embodiment of a bitumen upgrading unit or facility 14 is shown in FIG. 3, as comprising an atmospheric pipe still or stripper 90, a vacuum fractionater 92, a fluid coker 94, a gas oil hydrotreater 96, a combined naphtha and middle distillate hydrotreater 98 and a distillate fractionater 100. The mixture of bitumen and naphtha diluent passes from line 22 into the first fractionater 90, in which the incoming mixture is separated into a light, 650–700° F.– fraction and a heavy, 650–700° F.+ bottoms fraction. The lighter material is removed from 90 via line 102 and passed to hydrotreater 98, while the heavier fraction is passed, via line 104, to vacuum fractionater 92. Optionally, hydrocarbons boiling in the naphtha boiling range (e.g., the naphtha diluent) may be separated and removed from 90 via line 106. In vacuum fractionater 92, the heavy 650–700° F.+ bitumen stream from 90 is separated into a 1050° F.– (heavy gas oil) fraction and 1050° F.+ bottoms material. The gas oil is removed from 92 and passed into hydrotreater 96 via lines 108 and 116. The very heavy and bituminous 1050° F.+ bottoms material is removed from 92 via line 110, and passed into fluid coker 94. In 94, which is a noncatalytic unit, the bitumen contacts hot coke particles which thermally crack it to lower boiling hydrocarbons and coke. The coke is withdrawn from the bottom via line 112. While not shown, this coke is partially combusted to heat it back up the bitumen cracking temperature of about 900–1100° F. This consumes part of the coke, with the hot coke remaining passed back into the coker, to provide the heat for the thermal cracking. The lower boiling hydrocarbons produced in the coker comprise naphtha, middle distillates and a heavy gas oil. Those boiling in the naphtha and middle distillate ranges (e.g., $C_5$-650/700° F.) are passed, via lines 114 and 102 into hydrotreater 98. The gas oil fraction produced in the coker is passed into the gas oil hydrotreater 96, via line 116. Hydrogen or a hydrogen containing treat gas is passed into the hydrotreaters via lines 118 and 120. In the hydrotreaters, the hydrocarbons react with the hydrogen in the presence of a suitable sulfur and aromatics resistant hydrotreating catalyst to remove heteroatom (e.g., sulfur and nitrogen) compounds, unsaturated aromatics and metals. The hydrotreated heavy gas oil is removed from hydrotreater 96 via line 128. The hydrotreated naphtha and middle distillates produced in 98 pass into fractionater 100, via line 122. Fractionater 100 separates the hydrotreated hydrocarbons into the desired fractions, such as light or heavy naphtha, diesel fuel, jet fuel, kerosene, etc. For maximum diesel production, only a light naphtha will be recovered via line 124, while most of the remaining hydrocarbons are removed as diesel via line 126. This diesel is relatively low in cetane number. Its cetane number may be increased by blending it with higher cetane hydrocarbons, such as a diesel fraction produced by the gas conversion process.

Hydrocarbon synthesis catalysts are well known and are prepared by compositing the catalytic metal component(s) with one or more catalytic metal support components, which may or may not include one or more suitable zeolite components, by ion exchange, impregnation, incipient wetness, compositing or from a molten salt, to form the catalyst precursor. Such catalysts typically include a composite of at least one Group VIII catalytic metal component supported on, or composited with, with at least one inorganic refractory metal oxide support material, such as alumina, amorphous, silica-alumina, zeolites and the like. The elemental Groups referred to herein are those found in the Sargent-Welch Periodic Table of the Elements, © 1968 by the Sargent-Welch Scientific Company. Catalysts comprising a cobalt or cobalt and rhenium catalytic component, particularly when composited with a titania component, are known for maximizing aliphatic hydrocarbon production from a synthesis gas, while iron catalysts are known to produce higher quantities of aliphatic unsaturates. These and other hydrocarbon synthesis catalysts and their properties and operating conditions are well known and discussed in articles and in patents. The term "hydrotreating" as used herein refers to processes wherein hydrogen or hydrogen in a hydrogen-containing treat gas reacts with a feed in the presence of one or more catalysts active for the removal of heteroatoms (such as sulfur and nitrogen), metals, saturation of aromatics and, optionally, saturation of aliphatic unsaturates. Such hydrotreating catalysts include any conventional hydrotreating catalyst, such as comprising at least one Group VIII metal catalytic component, preferably at least one of Fe, Co and Ni, and preferably at least one Group VI metal catalytic component, preferably Mo and W, on a high surface area support material, such as alumina. Other suitable hydrotreating catalysts include zeolitic components.

Hydrotreating conditions are well known and include temperatures and pressures up to about 450° C. and 3,000 psig, depending on the feed and catalyst.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. An integrated gas conversion and bitumen production process comprises (i) stimulating the production of bitumen with steam obtained from a natural gas fed gas conversion process that produces steam and hydrocarbons, including liquid hydrocarbons and, (ii) diluting said produced bitumen with a diluent comprising at least a portion of said liquid hydrocarbons to form a pipelineable fluid mixture comprising said bitumen and diluent, and (iii) transporting said mixture by pipeline to a bitumen upgrading facility.

2. A process according to claim 1 wherein said natural gas is treated to remove sulfur compounds and, optionally $CO_2$ and/or nitrogen before being used as feed in said gas conversion process.

3. A process according to claim 2 including upgrading said bitumen.

4. A process according to claim 3 wherein said diluent comprises naphtha or a heavy naphtha.

5. A process according to claim 4 wherein said steam used for stimulating said bitumen production comprises high pressure steam obtained by cooling hot synthesis gas produced from said treated natural gas in said gas conversion process.

6. A process according to claim 4 wherein hydrogen is produced from said synthesis gas.

7. A process according to claim 5 wherein said hydrogen is used for hydroprocessing at least a portion of said hydrocarbons produced by said gas conversion process.

8. A process according to claim 6 wherein a portion of said diluent is recovered from said transported bitumen and recycled back to said bitumen production, to dilute said bitumen for said transport.

9. An integrated gas conversion and bitumen production process comprises the steps of (i) converting natural gas to a hot synthesis gas, (ii) producing liquid hydrocarbons and steam from said synthesis gas in at least one hydrocarbon synthesis reactor, (iii) using a portion of said steam to produce bitumen, and (iv) using a portion of said liquid hydrocarbons to dilute said bitumen to lower its viscosity sufficient to enable it to be transported to a bitumen upgrading facility by pipeline.

10. A process according to claim 8 wherein said natural gas is treated to remove sulfur compounds and, optionally $CO_2$ and/or nitrogen before being converted to said synthesis gas.

11. A process according to claim 9 including upgrading said bitumen to lower boiling material.

12. A process according to claim 10 wherein said diluent comprises naphtha or a heavy naphtha.

13. A process according to claim 11 wherein said steam used for stimulating said bitumen production comprises at least one of (i) steam obtained by cooling said hot synthesis gas and (ii) steam obtained by cooling said hydrocarbon synthesis reactor.

14. A process according to claim 13 wherein hydrogen is produced from said synthesis gas.

15. A process according to claim 14 wherein said hydrogen is used for hydroprocessing at least a portion of said hydrocarbons produced by said gas conversion.

16. A process according to claim 14 wherein a portion of said diluent is recovered from said transported bitumen and recycled back to said bitumen production to dilute said bitumen for said transport.

17. An integrated gas conversion and bitumen production process comprises:
   (i) converting natural gas to a hot synthesis gas comprising a mixture of $H_2$ and CO which is cooled by indirect heat exchange with water to produce high pressure steam;
   (ii) contacting said cool synthesis gas with a hydrocarbon synthesis catalyst in at least one hydrocarbon synthesis reactor, at reaction conditions effective for said $H_2$ and CO in said gas to react and produce heat, liquid hydrocarbons which include a naphtha fraction and a gas comprising methane and water vapor;
   (iii) removing said heat from said reactor by indirect heat exchange with water to produce medium pressure steam;
   (iv) passing at least a portion of said steam produced in either or both steps (i) and (iii) down into a subterranean tar sand formation having a bitumen drainage area that is penetrated by a well, to heat said bitumen and reduce its viscosity sufficient for it to be removed up through said well;
   (v) producing said bitumen by removing it from said well;
   (vi) reducing the viscosity of said produced bitumen by mixing it with a diluent comprising said naphtha fraction to produce a pipelineable mixture, and
   (vii) transporting said mixture by pipeline to a bitumen upgrading facility.

18. A process according to claim 17 wherein said natural gas is treated to remove sulfur compounds and, optionally $CO_2$ and/or nitrogen before being converted to said synthesis gas.

19. A process according to claim 18 wherein said naphtha comprises light naphtha.

20. A process according to claim 19 wherein said gas comprising said methane and water vapor is cooled to form a methane-containing tail gas and water.

21. A process according to claim 20 wherein said tail gas is used as fuel for generating steam or power for at least one of (i) said bitumen production and (ii) said gas conversion.

22. A process according to claim 21 wherein said water is heated to produce steam for at least one of (i) said bitumen stimulation or (ii) power for said bitumen production or gas conversion.

* * * * *